(12) United States Patent
Møller Hansen et al.

(10) Patent No.: US 9,124,153 B2
(45) Date of Patent: Sep. 1, 2015

(54) DIRECT DRIVE GENERATOR

(75) Inventors: Frank Møller Hansen, Arden (DK); Jonas Kristensen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 62 days.

(21) Appl. No.: 13/978,071

(22) PCT Filed: Jan. 5, 2011

(86) PCT No.: PCT/EP2011/050095
§ 371 (c)(1),
(2), (4) Date: Jul. 2, 2013

(87) PCT Pub. No.: WO2012/092967
PCT Pub. Date: Jul. 12, 2012

(65) Prior Publication Data
US 2013/0277985 A1    Oct. 24, 2013

(51) Int. Cl.
  *F03D 9/00*   (2006.01)
  *H02P 9/04*   (2006.01)
  (Continued)

(52) U.S. Cl.
  CPC ............... *H02K 7/183* (2013.01); *F03D 9/002* (2013.01); *F03D 11/0008* (2013.01); *H02K 5/24* (2013.01); *H02K 7/088* (2013.01); *H02K 21/02* (2013.01); *F05B 2220/7066* (2013.01);
  (Continued)

(58) Field of Classification Search
  CPC ....... Y02E 10/70; Y02E 10/721; F03D 9/002; H02J 3/386; H02K 7/1823; H02K 57/003; H02K 7/1838; H02K 15/14; H02K 35/02; H02K 3/28; H02K 7/1807; H02K 7/183; Y02B 10/30

USPC ........... 290/44, 43, 54; 415/5, 126–128, 135, 415/138
  See application file for complete search history.

(56) References Cited

U.S. PATENT DOCUMENTS 3,028,727 A  *  4/1962  Anston ......................... 60/473
2005/0167988 A1 *  8/2005  Wood ............................. 290/53
(Continued)

FOREIGN PATENT DOCUMENTS

EP   2088664 A1   8/2009
EP   2106013 A2   9/2009

OTHER PUBLICATIONS

International Searching Authority, Search Report and Written Opinion issued in corresponding International Application No. PCT/EP2011/050095 issued Oct. 18, 2011, 12 pages.

*Primary Examiner* — Tulsidas C Patel
*Assistant Examiner* — Charles Reid, Jr.
(74) *Attorney, Agent, or Firm* — Wood, Herron & Evans, LLP

(57) ABSTRACT

Disclosed is a direct drive generator for a wind turbine, the generator including a rotor, a stator configured to remain stationary relative to the rotor, and at least one bearing connected to the stator. The rotor includes at least one rotor part extending circumferentially about an axis of rotation and a plurality of active materials arranged on a side of the at least one rotor part. The stator includes at least one stator part extending circumferentially about the axis of rotation and positioned adjacent to the at least one rotor part, and at least one winding arrangement supported by the at least one stator part and facing the plurality of active materials. The bearing is flexibly connected to the at least one stator part, wherein the bearing abuts the rotor part to help maintain a gap between the at least one winding arrangement and the active materials.

17 Claims, 4 Drawing Sheets

(51) Int. Cl.
  H02K 5/16 (2006.01)
  H02K 7/08 (2006.01)
  H02K 7/18 (2006.01)
  F03D 11/00 (2006.01)
  H02K 5/24 (2006.01)
  H02K 21/02 (2006.01)
(52) U.S. Cl.
  CPC ........... *F05B 2240/52* (2013.01); *Y02E 10/722* (2013.01); *Y02E 10/725* (2013.01)

(56) References Cited

U.S. PATENT DOCUMENTS

| | | |
|---|---|---|
| 2006/0097582 A1 | 5/2006 | Engstrom |
| 2009/0206684 A1* | 8/2009 | Jajtic et al. .................. 310/12.31 |
| 2009/0243301 A1* | 10/2009 | Longtin et al. .................. 290/55 |
| 2011/0121579 A1* | 5/2011 | Eriksen et al. .................. 290/55 |
| 2011/0123339 A1* | 5/2011 | Eriksen et al. ............ 416/169 R |

\* cited by examiner

DIRECT DRIVE GENERATOR

FIELD OF THE INVENTION

The present invention relates to a direct drive generator for a wind turbine, the generator comprising a rotor, a stator, and bearings flexibly connected to the stator. The present invention also relates to a wind turbine including such a direct drive generator.

BACKGROUND ART

In a generator of a wind turbine, it is important to maintain an air gap between rotor and stator components as stable as possible to increase the efficiency of the wind turbine.

When a wind turbine has a direct drive generator, i.e. when it has no intermediate gear between the components directly driven by the wind and the generator, the circumference of the generator rotor is larger than that of a generator rotor in a wind turbine which has a gear. The purpose of the larger circumference is to have more active material to compensate for the rotor rotating less frequently. This enables such a "direct drive" wind turbine to generate as much electricity, or more electricity, as a wind turbine with a gear.

One of the challenges associated with direct drive wind turbines is maintaining an air gap between the rotor and stator of the generator. The air gap may be a radial or axial gap, depending on the design of the generator. Due to the magnetic force between the rotor and the stator, the rotor and stator are drawn to each other, thereby decreasing the air gap. In prior art solutions, bearings of different kinds have been mounted to the stator. The bearings rest against the rotor while it rotates to maintain the air gap.

Challenges still remain despite these attempts to address them. For example, the stator is a rigid and heavy component that resists being drawn toward the rotor. With some portions of the stator able to resist the forces and other portions deflecting slightly because they are not able to, the bearings may become somewhat tilted from their desired position. In this way, the optimal air gap between the stator and the rotor is not maintained and the bearings may be subjected to increase wear.

SUMMARY OF THE INVENTION

An object of the present invention is, at least partly, to overcome the above disadvantages and drawbacks of the prior art and to provide a direct drive generator having a support structure for the bearing, enabling a more even air gap between the rotor and the stator during generation of electrical energy to decrease the wear in the bearing and increase the production efficiency of the wind turbine.

The above objects, together with numerous other objects, advantages, and features, which will become evident from the below description, are accomplished by a solution in accordance with the present invention by a direct drive generator for a wind turbine, the generator comprising:

- at least one rotor part extending circumferentially around the axis of rotation, and
- a plurality of active materials arranged on at least one rotor part, and
- a stator configured to remain stationary relative to the rotor, comprising:
    - at least one stator part extending circumferentially around the axis of rotation and positioned adjacent to the at least one rotor part,
    - at least one winding arrangement supported by the at least one stator part and facing the plurality of active materials, and
    - at least one bearing flexibly connected to the at least one stator part, wherein the bearing abuts the rotor part to help maintain a gap between the at least one winding arrangement and the active materials.

Having a flexible connection between the bearing and the stator enables the bearing to transfer bending moments from magnetic attraction forces to the stator part instead of absorbing the bending moments itself. This substantially reduces the wear of the bearing, and furthermore reduces the noise being generated by the connection between the bearing and the rotor.

The side of the rotor part may be perpendicular to the axial direction, so that an axial air gap may be maintained, or perpendicular to a radial direction, so that a radial air gap is maintained, such as in a radial flux machine.

Moreover, the stator may further comprise a flexible structure connecting the at least one bearing to the at least one stator part, the flexible structure being more flexible in an axial direction than the at least one stator part.

When the flexible structure is more flexible in the axial direction, the flexible structure can absorb some of the bending moment without substantially damaging the rigidity of the stator.

In one embodiment, the flexible structure may have a first portion connected with the bearing and a second portion connected with the stator part, the first and second portions being connected by a transition portion to create a radial distance between the first and second portions and the first portion having a longer axial extension than the second portion.

Furthermore, the transition portion may have a curved shape between the first portion and the second portion.

In addition, the stator may comprise a connecting element extending radially towards the axis of rotation, the connecting element being more flexible in the axial direction than in a radial direction.

In one embodiment of the invention, the flexible structure may be arranged so as to absorb a force generated by a magnetic attraction force between the rotor and the stator.

Furthermore, the bearing may be connected with a first end of the flexible structure, and a second end of the flexible structure may be connected with the stator part.

In addition, the flexible structure, when seen in the circumferential direction of the stator, may have a meander shape, a C-shape, a G-shape or the like resilient shape.

This allows for a flexible design of the flexible structure and for the system to be made of any kind of material and not be limited to a flexible material.

Moreover, the flexible structure may be made of a material having an inherent spring force.

Furthermore, the flexible structure may comprise a ball-and-socket joint for connecting with the bearing. By having a ball-and-socket joint, it is possible to keep the face of the bearing opposite the rotor face more parallel to the rotor than if the system did not have such a joint.

In an embodiment of the invention, the flexible structure may comprise a universal joint, a U-joint, a Cardan joint, a Hardy-Spicer joint or a Hooke's joint.

Moreover, the flexible structure may comprise a spring. The spring may be arranged between the first portion and the transition portion or between the second portion and the transition portion.

Additionally, the flexible structure may comprise a gas or hydraulic cylinder absorbing the force generated by a magnetic attraction force between the rotor and the stator.

In another embodiment, a rotor plane diameter may be the diameter measured from tip to tip of the rotor blades, and a diameter of the stator and/or the rotor may be at least 5% of the rotor plane diameter. However, the flexible structure may be used in other embodiments with a smaller diameter stator and/or rotor.

Additionally, the rotor may comprise two rotor parts with active materials, and the stator part may be connected with two sets of winding arrangements; one set facing the active materials of one rotor part and the other set facing the active materials of the other rotor part.

The present invention furthermore relates to a wind turbine comprising the direct drive generator described above.

Finally, the invention relates to the use of the direct drive generator as described above for generating electricity in a wind turbine.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF THE INVENTION

Figure 1:
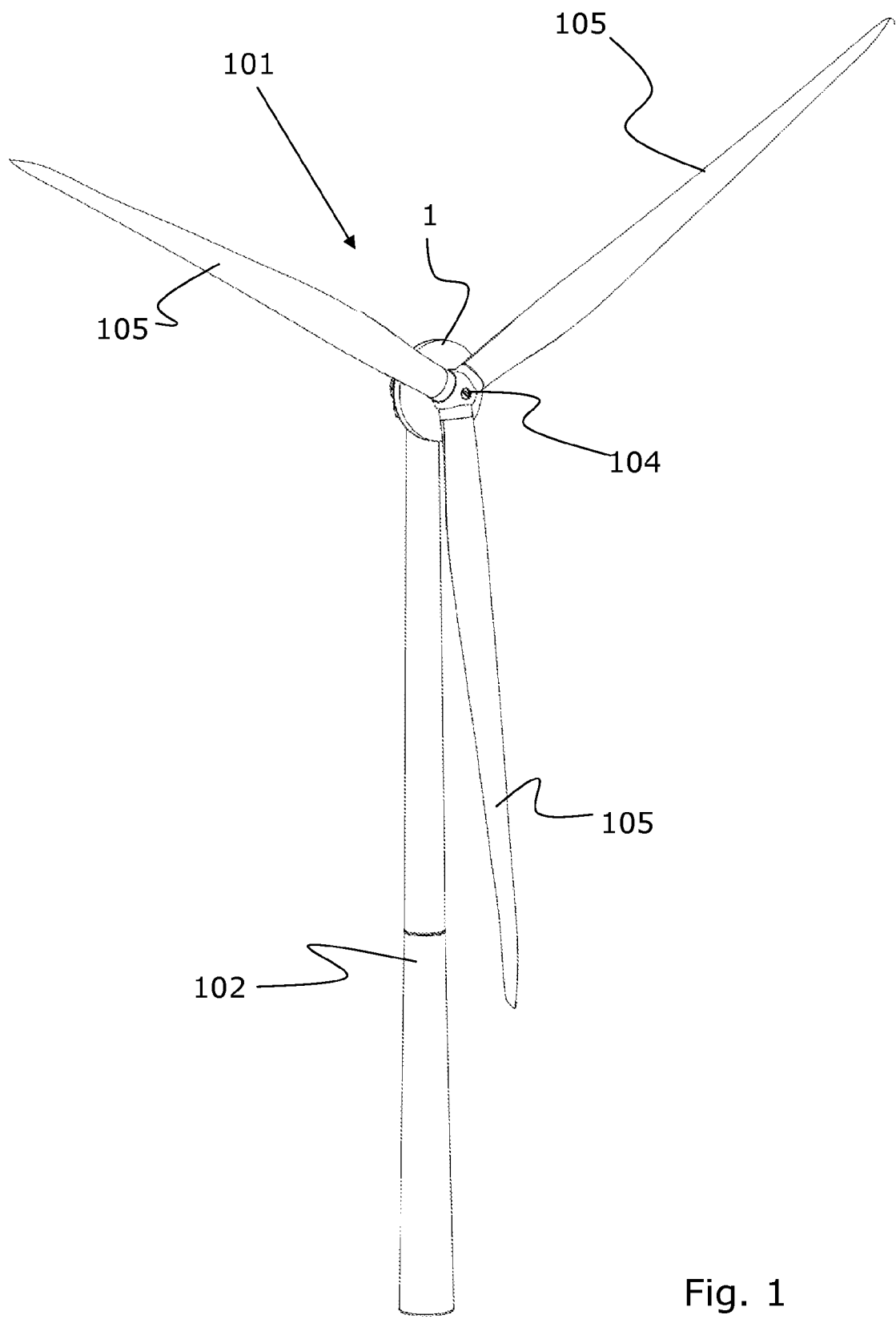
FIG. 1 is a perspective view of a wind turbine.

FIG. 1 shows one embodiment of a wind turbine 101. The wind turbine generally comprises a tower 102, a frame or nacelle (not shown) supported by the tower, and a rotor attached to the nacelle. The rotor includes a hub 104 rotatably mounted to the nacelle and a set of rotor blades or wings 105 coupled to the hub. The rotor blades convert the kinetic energy of the wind into mechanical energy used to rotate a generator 1 of the wind turbine 101.

In FIG. 1, the generator 1 is shown as a direct drive generator. As will be described in greater detail below, this type of generator includes a rotor driven by the rotor blades 105 and a stator fixed to the frame or nacelle. Thus, the wind turbine 101 does not have an intermediate gear to increase the rotational speed input to the generator 1. This creates a need for the rotor and stator components of the generator to have a larger diameter to be able to produce comparable or greater amounts of electrical energy as a wind turbine with an intermediate gear. The diameter of the rotor and/or stator is at least 5% of the diameter of the rotor plane, i.e. the diameter of a circle drawn between the tips of the rotor blades 105.

When generating energy from the rotation of the rotor in relation to the stator, an air gap there between needs to be maintained for an optimal utilisation of the rotational force. In order to help maintain the air gap in a direct drive generator, a bearing is sometimes arranged between the rotor and the stator. Due to the large diameters of the rotor and the stator, the air gap which needs to be maintained is situated very far from the centre of rotation and thus, a very small dislocation in the centre of rotation becomes very large in the periphery. Furthermore, the rotor is very heavy and thus requires a greater momentum of resistance and the prior art solutions have been very rigid. However, such rigidity causes the bearing to tilt and the wear in the bearing increases accordingly.

Figure 2:
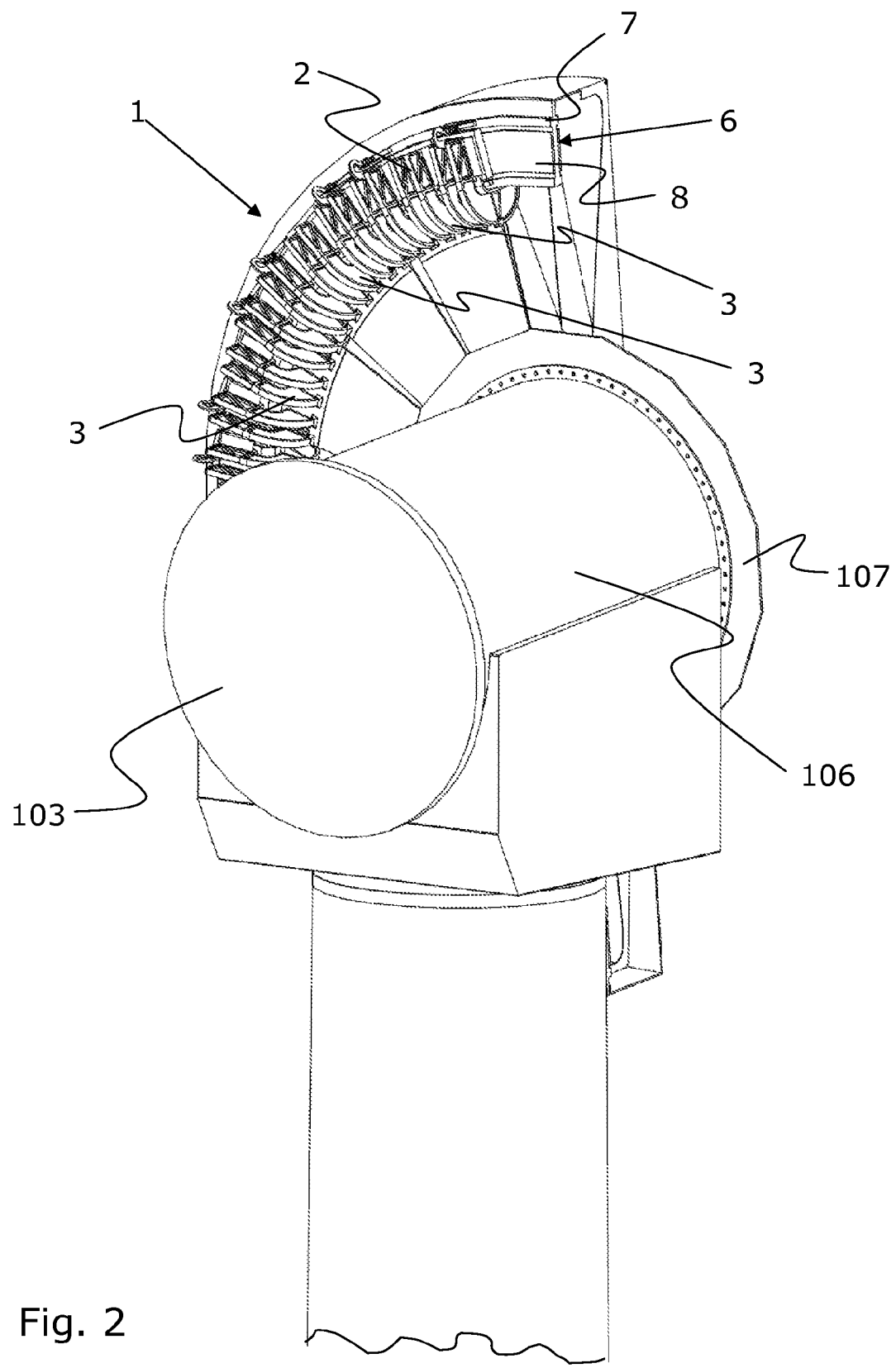
FIG. 2 is a perspective view of a portion of a direct drive generator including a stator and a rotor of the wind turbine of FIG. 1.

FIG. 2 shows one possible embodiment of the direct drive generator 1. Indeed, the description below focuses on the design of the generator 1 itself rather than its arrangement with respect to the other components of the wind turbine 101. Therefore, persons skilled in the art will appreciate that FIG. 1 is merely one example of how the generator 1 may be incorporated into a wind turbine. Other ways will be readily apparent to persons skilled in the art.

FIG. 2 shows a partial view of the generator 1. Only a part of the generator 1 is shown to elucidate the invention. Even though not shown, the different components of the generator 1 extend around the centre of rotation and thereby create a circle having a large diameter. The generator 1 is in FIG. 2 shown in a perspective from the rear end of the nacelle 103 covered by a nacelle cover 106.

As shown in FIG. 2, the direct drive generator 1 includes a stator 2 arranged in relation to a rotor 6. The rotor 6 is in the form of as a disc having a large hole in its centre. More specifically, the rotor 6 comprises a disc-shaped rotor part 7 having side faces 8 (FIG. 4) on which a plurality of active materials (not shown) are arranged. The active materials may be, for example, both hard and soft magnetic materials in combination with windings or not. The stator 2 is shown in the form of stator parts or segments 3 surrounding the rotor 6 from within, thereby enabling connection of the rotor 6 to the rotor blades 105 (FIG. 1) directly or via a hub for rotating in relation to the stator 2. The stator 2 may be connected to a centre shaft, the frame of the nacelle, or some other stationary component. In this embodiment, the stator parts or segments 3 are connected to the nacelle 103 via a disc-shaped frame 107 which forms part of the nacelle 103 and via connecting elements 17. The connecting elements 17 are more flexible in the axial direction than in a radial direction, as will be described below.

Figure 3:
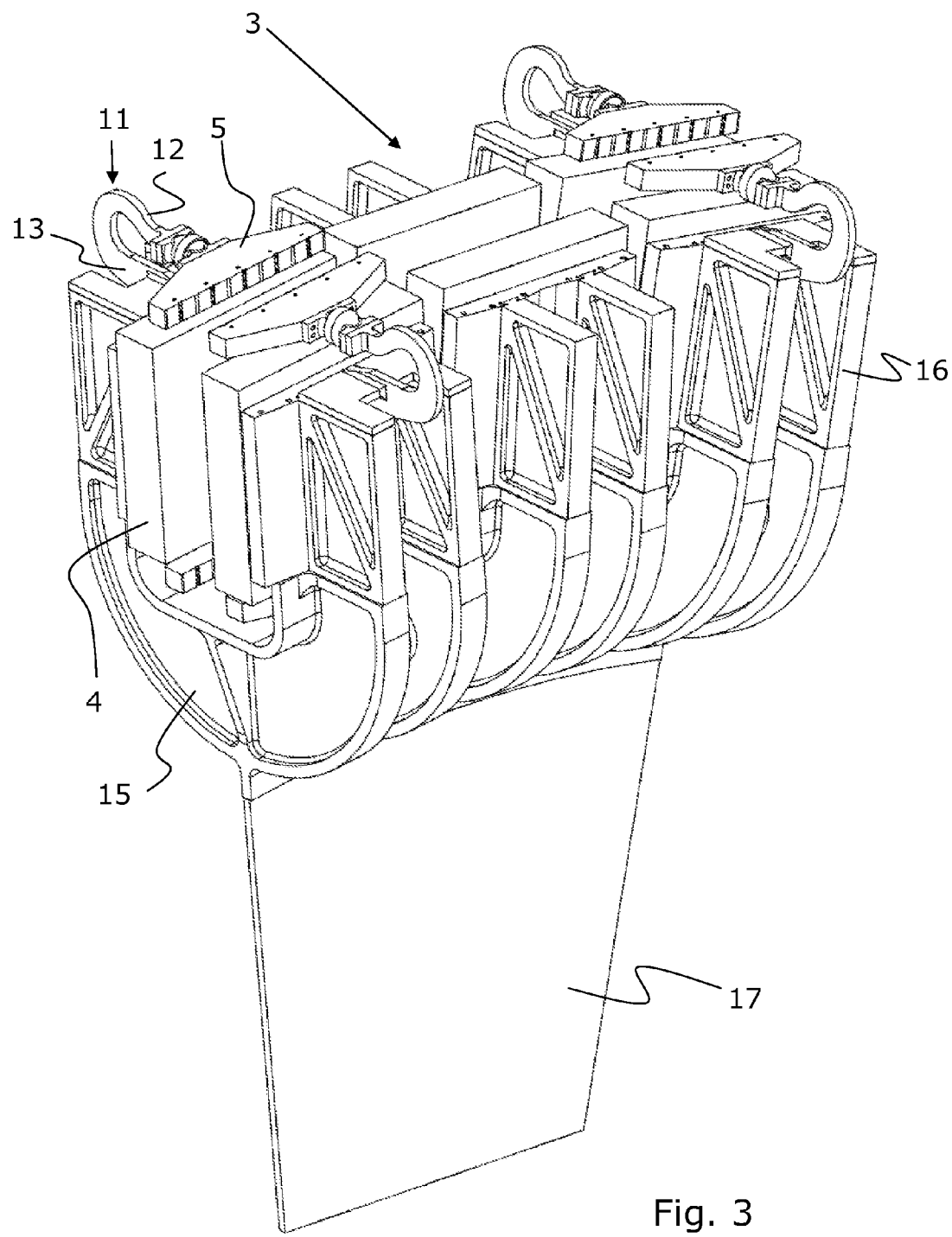
FIG. 3 is a perspective view of a portion of the generator in FIG. 2.
Figure 4:
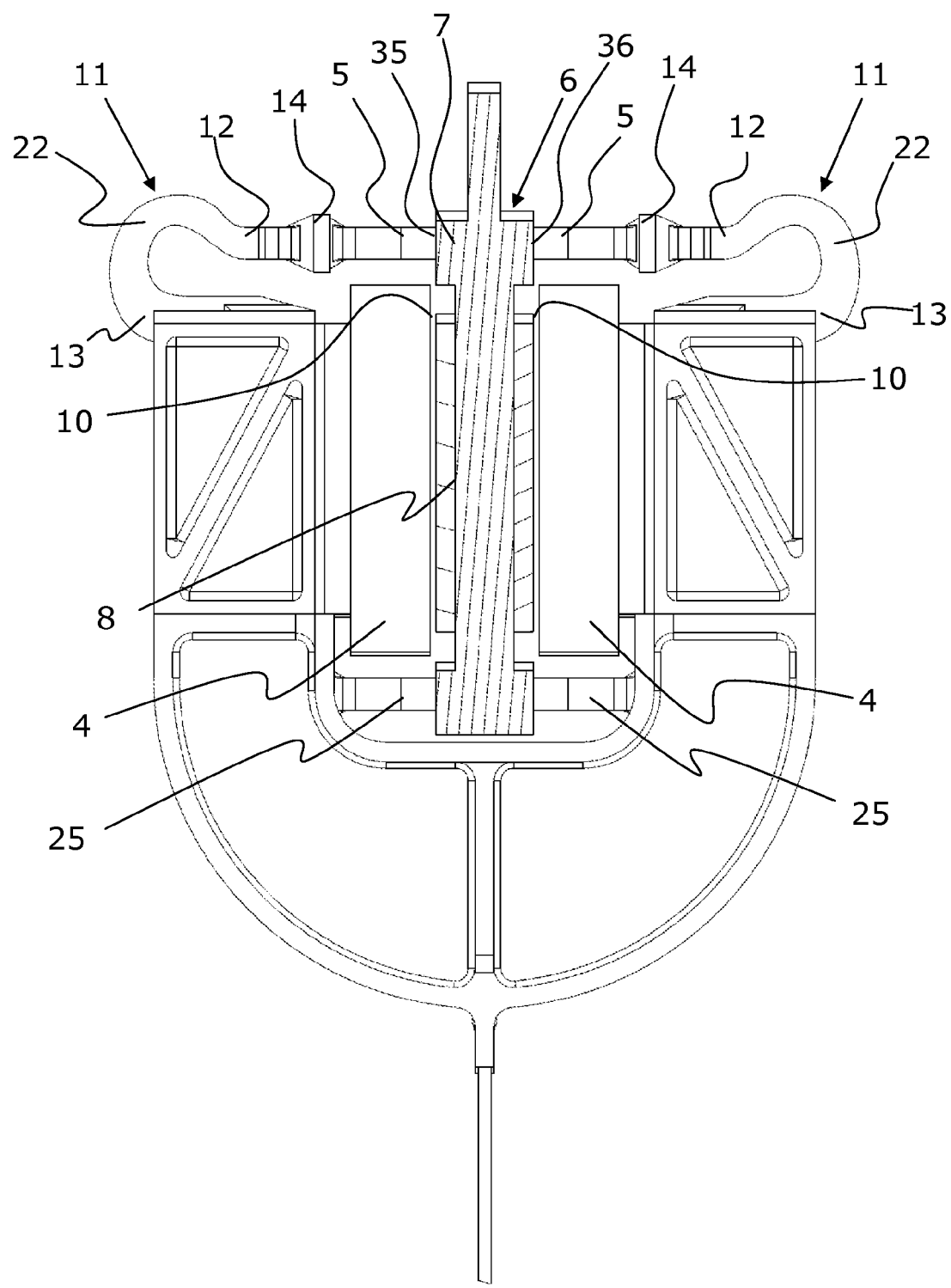
FIG. 4 is a cross-sectional view of the rotor of the generator of FIG. 3.

In FIGS. 2-4, the stator 2 is shown in the form of stator parts, segments or modules, which evenly cover a 360 deg circle. However, in another not shown embodiment, the stator 2 may comprise only one element.

In FIG. 3, the stator part 3 is shown in perspective. Each stator part or segment 3 supports a winding arrangement 4 (hereinafter "coils 4"). More specifically, each stator part 3 includes a base 15 and one or more intermediate holders 16 supporting the coils 4, allowing portions of the holders 16 to function as a core within the coils 4. The rotor (not shown) is arranged parallel to the coils 4 with a mutual distance. Each holder 16 is formed as a frame structure having lamellae. Although FIG. 3 illustrates the stator part 3 comprising three sets of holders 16 on each side of the rotor, there may be as few as one set per stator part in other embodiments. Each holder 16 may support a single coil or, alternatively, multiple coils.

The base 15 of each stator part 3 is somewhat curved so as to conform to the inner circumference of the rotor (not shown). This is best illustrated in FIG. 4 which shows the rotor 6 within the stator 2. The holders 16 may be integrated with the bases 15 when the stator parts 3 are formed, or they may be separate parts fastened to the bases 15 in a subsequent process.

Each stator part 3 is formed to absorb bending moments instead of the bending moment being absorbed in bearings 5 mounted to the stator parts 3. The bearings may be any kind of bearing element, such as rollers, sliding pads, and even an oil film. As shown in FIG. 4, the bearings 5 abut the rotor part 7 to maintain an air gap between the coils 4 and the active materials of the rotor 6.

To this end, the bearings 5 are supported by respective flexible structures 11 extending from the stator parts or segments 3. Each bearing 5 is flexibly connected with a first portion 12 of the corresponding flexible structure 11. A second portion 13 of each flexible structure 11 is connected with the corresponding stator part 3 via the holders 16. The bearings 5 rest against the rotor part 7 of the rotor 6 to help maintain the air gap substantially constant during rotation of the rotor 6, and thereby during rotation of the rotor blades 105 (FIG. 1).

Furthermore, the magnetic attraction between the rotor 6 and the stator 2 may result in a slight bend of the rotor part 7 or the stator parts 3, thereby forcing the bearings 5 to move in an axial direction. The bearings 5 are suspended so as to slightly bend to accommodate this movement, resulting in the bending moment being transferred to the stator parts 3 themselves instead of being absorbed in the bearings 5. This substantially reduces the wear in the bearings 5 and furthermore reduces the noise being generated by the connection between the bearings 5 and the rotor 6. The flexible structures 11 are nevertheless stiff enough to maintain the air gap between the magnets and the coils 4.

In FIG. 4, a ball-and-socket joint 14 is arranged between the flexible structures 11 and bearings 5 to keep an end face of each bearing 5 parallel to faces 35, 36 of the rotor 6. The flexible structures 11 are connected with the stator parts 3 at or near their outermost end in the radial direction.

In another embodiment, a universal joint, a U-joint, a Cardan joint, a Hardy-Spicer joint, or a Hooke's joint is arranged between each flexible structure 11 and bearing 5. These joints, like the ball-and-socket joint 14, are possible ways of flexibly connecting the bearings 5 and flexible structures 11. The geometry of the flexible structures 11 themselves is an alternative or additional way.

Indeed, as can be seen in FIG. 4, the first portion 12 of each flexible structure 11 has a longer axial extension than the second portion 13. The first and second portions of each flexible structure 11 are connected by a transition portion 22 and have a radial distance between them to provide the flexible structure 11 with flexibility. The transition portion 22 has a curved shape extending between the first portion 12 and the second portion 13, which helps provide the flexible structures 11 with the ability to bend.

In the particular embodiment shown, the first and second portions 12, 13 and transition portions 22 define a C-shaped design for the flexible structures 11. In another embodiment, the flexible structures 11 may have another suitable resilient design, such as a meander shape, a G-shape, or the like. And although the stator part 3 shown in FIG. 4 has a U-shaped cross-section, the stator part 3 may have any suitable shape.

Furthermore, additional bearings 25 are arranged between the base parts 15 and the inner diameter of the rotor 6, as shown in FIG. 4. The bearings 25 assist in maintaining the air gap 10.

The flexible structure 11 is made of a material having an inherent spring force and a resilient design, or it may merely be made from a resilient material. The flexible structure 11 may also have a spring, which allows for larger production tolerances, making the system easier and cheaper to manufacture. The spring can be arranged between the transition portion 22 and the first or second portion 12, 13.

Alternatively or additionally, the flexible structure 11 may have a gas or hydraulic cylinder (not shown) so as to absorb the bending moment being generated by the magnetic attraction force between the rotor 6 and the stator 2. Having a gas or hydraulic cylinder allows for the production tolerances to be larger and less accurate.

Furthermore, the flexible structure 11 may have adjustable means enabling adjustment of inaccuracies, allowing for larger tolerances during production of the system.

As mentioned above, the flexible connection between the bearings 5 and stator parts 3 helps transfer bending moments to the stator parts 3 so that the forces are not absorbed in the bearings 5. Advantageously, the flexible structures 11 have a stiffness which is higher than the "negative stiffness" created by the magnetic field between the active materials of the rotor 6 and those of the stator. The stator parts 3 may be designed with a high degree of stiffness to resist the bending moments. To further allow for some misalignment between the rotor and stator despite such stiff components, other aspects of the stator 2 may be designed accordingly. For example, FIG. 3 shows that the stator further comprises a connecting element 17 extending radially towards the axis of rotation (not shown). The connecting element 17 is more flexible in the axial direction than in a radial direction. The connection element 17 is a plate-shaped element mounted to a centre shaft (not shown) of the generator 1 increasing the rigidity in both the radial and tangential direction of the stator while being flexible in the axial direction.

Although the invention has been described above in connection with possible embodiments of the invention, it will be evident for a person skilled in the art that several modifications are conceivable without departing from the invention as defined by the following claims. For example, the sides 8 of the rotor part 7 are perpendicular to the axial direction, such that an axial air gap is maintained, but in another embodiment, the sides may be perpendicular to a radial direction, such that a radial air gap is maintained, for example in a radial flux machine.

The invention claimed is:

1. A direct drive generator for a wind turbine, the generator comprising:
    a rotor configured to rotate about an axis of rotation, the rotor comprising a generally disk shaped rotor part extending circumferentially around the axis of rotation and having opposed faces generally perpendicular to the axis of rotation,
    a plurality of active materials arranged on at least one face of the rotor part,
    a stator configured to remain stationary relative to the rotor, the stator comprising at least one stator part extending circumferentially around the axis of rotation and positioned adjacent to the at least one face of the rotor part,
    at least one winding arrangement supported by the at least one stator part and facing the plurality of active materials, and
    at least one thrust bearing flexibly connected to the at least one stator part,
    wherein the bearing abuts the rotor part to help maintain a gap between the at least one winding arrangement and the active materials and the stator further comprises a flexible structure connecting the at least one bearing to the at least one stator part, the flexible structure being more flexible in an axial direction than the at least one stator part.

2. The direct drive generator according to claim 1, wherein the flexible structure has a first portion connected with the bearing and a second portion connected with the stator part, the first and second portions being connected by a transition portion to create a radial distance between the first and second portions, and the first portion having a longer axial extension than the second portion.

3. The direct drive generator according to claim 2, wherein the transition portion has a curved shape curving between the first portion and the second portion.

4. The direct drive generator according to claim 1, wherein the flexible structure, when seen in the circumferential direction of the stator, has a meander shape, a C-shape, a G-shape resilient shape.

5. The direct drive generator according to claim 1, wherein the flexible structure is made of a material having an inherent spring force.

6. The direct drive generator according to claim 1, wherein the flexible structure comprises a ball-and-socket joint for connecting with the bearing.

7. The direct drive generator according to claim 1, wherein the flexible structure comprises a universal joint, a U-joint, a Cardan joint, a Hardy-Spicer joint or a Hooke's joint.

8. The direct drive generator according to claim 1, wherein the flexible structure comprises a spring.

9. The direct drive generator according to claim 1, wherein the flexible structure comprises a gas or hydraulic cylinder absorbing the force generated by a magnetic attraction force between the rotor and the stator.

10. The direct drive generator according to claim 1, wherein the flexible structure is connected with the stator part on an outer end when seen in a radial direction from a centre of the stator.

11. The direct drive generator according to claim 1, wherein the gap is a radial gap.

12. The direct drive generator according to claim 1, wherein the stator comprises a connecting element extending radially towards the axis of rotation, the connecting element being more flexible in the axial direction than in a radial direction.

13. The direct drive generator according to claim 1, wherein the rotor comprises one or two rotor parts with active materials, and wherein the stator part is connected with two sets of winding arrangements; one set of winding arrangements facing the active materials of one rotor part and the other set of winding arrangements facing the active materials of the other rotor part.

14. A wind turbine comprising a direct drive generator according to claim 1.

15. The direct drive generator of claim 1 further comprising:
a plurality of active materials arranged on each face of the rotor part,
the stator comprising a pair of stator parts each of which is positioned adjacent a respective face of the rotor part, and
a winding arrangement supported by each stator part and facing respective ones of the pluralities of active materials.

16. The direct drive generator of claim 15 wherein the at least one thrust bearing comprises a radially outer thrust bearing and a radially inner thrust bearing.

17. The direct drive generator of claim 16 wherein only the radially outer thrust bearing is flexibly connected to the at least one stator part with the flexible structure that is more flexible in the axial direction than the at least one stator part.

* * * * *